J. A. JONES.
CASTER.
APPLICATION FILED JUNE 6, 1918.
1,286,336.
Patented Dec. 3, 1918.
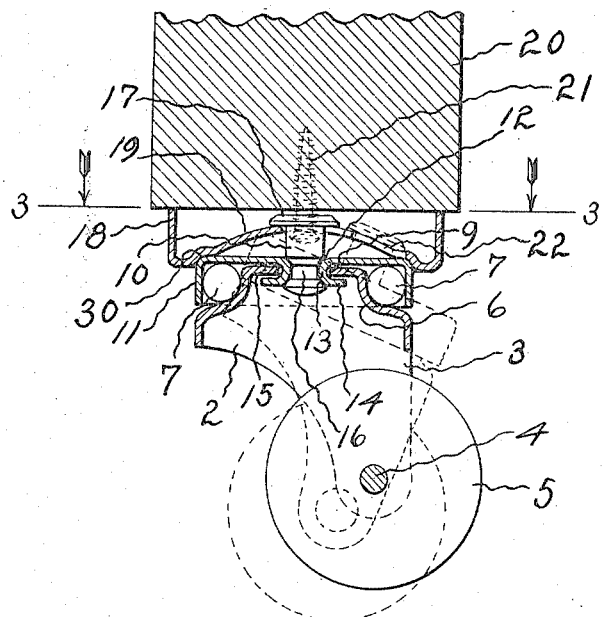
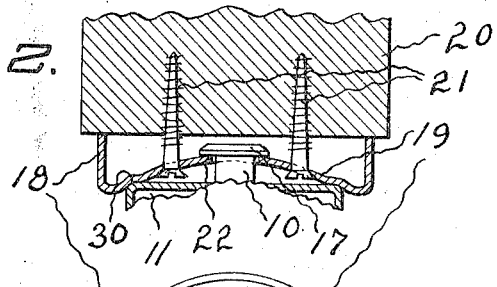
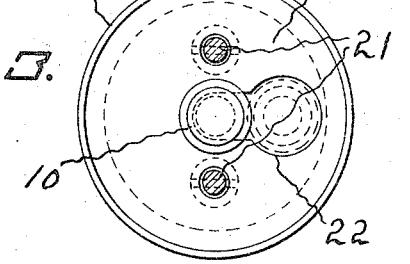
Inventor
J. A. Jones
By John W. Joy
Attorney

UNITED STATES PATENT OFFICE.

JOSIAH ALBERT JONES, OF HARTFORD, CONNECTICUT.

CASTER.

1,286,336. Specification of Letters Patent. Patented Dec. 3, 1918.

Application filed June 6, 1918. Serial No. 238,448.

*To all whom it may concern:*

Be it known that I, JOSIAH A. JONES, citizen of the United States, residing at Hartford, in the county of Hartford and State of Connecticut, have invented certain new and useful Improvements in Casters, of which the following is a specification.

This invention relates to casters. I have several fundamental motives in view, one being an effective way for quickly and rigidly connecting the parts of the caster to each other, and another to provide for the ready connection of the article to a piece of furniture. The caster comprises other points of novelty and advantage which with the foregoing will be set forth in detail in the following description, wherein I will disclose quite fully that form of embodiment of the invention which I have selected for illustration in the drawings accompanying and forming part of the present specification. This showing is intended to enable those versed in the art to practice the invention. Obviously I do not limit myself thereto; I may deviate therefrom in various respects within the scope of the invention defined by the claims following said description.

Referring to said drawings:

Figure 1 is a vertical sectional view of a caster and associated parts involving the invention, showing the same in correlation with an article of furniture but partially illustrated, the dotted lines representing a way of dismounting the caster.

Fig. 2 is a practically similar view at virtually right angles but only the upper part of the caster showing.

Fig. 3 is a horizontal section on the line 3—3 of Fig. 1, looking in the direction of the arrows.

Like characters refer to like parts throughout the several views.

The caster includes in its structure a bracket as 2, and while this bracket and certain of the other parts in fact may be of any suitable material, pressed metal is desirable, although malleable iron is another metal that can be used. This bracket 2 includes mating arms as 3 perforated to receive the shaft 4. Said shaft extends through the wheel 5 for example virtually in the way shown in my prior Letters Patent No. 832,794 of October 9, 1906, to which reference may be had. The body of the bracket 2 externally thereof has the race 6 to receive the balls 7 of which there may be any desirable number. The upper portion of said bracket 2 is furnished with an inwardly extending flat flange, the inner edge of which presents a circular opening 9 to receive a pivot or stud as 10, although the pivot or stud it might be observed at this point, does not extend directly through said circular opening 9. The pivot or stud 10 will be described more in detail hereinafter. Surmounting the body of the bracket is a cup-shaped head 11, the inner rounded marginal surface of which presents a race complemental to the race 6 for receiving the balls 7, thus maintaining the balls in position. The cup-shaped head 11 has in the upper side thereof the practically circular opening 12, the wall of which has a downturned flange 13, the lower end of which is outturned as at 14, the downturned flange extending through the opening 9 to which I have already referred, and the flange 14 overlying the inwardly flanged portion 15 of the body of the bracket 2.

The pivot or stud 10 to which I have already referred, extends comparatively freely through the opening 12 and its lower reduced end is provided with a circumferential groove 16 into which the inner rounded portion of the pendent flange 13 fits. The pivot or stud 10 extends above the cup-shaped head 11 and terminates at its upper end in a circular flange 17, constituting a convenient head.

Surmounting the head 11 is a cup-like part 18, the bottom 19 of which is as shown of concavo-convex form in cross section, the convex face being up yet slightly below the edge of the marginal flange of said part 18. This part 18 is attached to the article of whatever character it may be with which it is desired to associate the caster. Such an article is shown at 20, and it will be assumed to be a leg of a piece of furniture. The part 19 has its marginal flange fitted centrally to the under surface of the leg 20, and when this is done several screws as 21 can be passed through perforations in the portion 19 and into the leg 20. The concavo convex portion 19 as shown has a radial slot 22 preferably but not essentially of key-hole form with the large part out and with the narrow portion in position to receive the pivot or stud 10. The portion 19 it might be observed at this time possesses a certain amount of resiliency which is of advantage in maintaining the parts in assembled relation and against accidental separation, or a suitable spring for this purpose may be placed at or under the lower flange of stud 10.

It will be supposed that the cup-shaped part 18 is connected to a furniture leg as 20 and that the bracket 2 and parts carried thereby including the pivot or stud 10 are disconnected from said part 18 as illustrated practically for example in Fig. 1. To connect the parts the head or flange 17 will be passed through the enlarged portion of the slot 22 as shown by dotted lines in said view, and the bracket 2 will be tipped toward the left to cause the head or flange 17 to traverse the upper surface of the concavo-convex resilient portion 19, and thus enable the shank of the pivot or stud 10 to virtually bottom against the rear or back end of the slot 22 as shown by full lines in Fig. 1. The marginal portion of the part 11 when the parts are assembled fits the circular groove or channel 30 in the concavo-convex portion 19 which actually provides an effective way for maintaining the parts against accidental separation. To disconnect the caster from the cup-shaped part 18, the operation described will be reversed.

What I claim is:

1. A caster comprising a cup-like part provided with a concavo-convex bottom having an elongated slot combined with a caster member to fit against the cup-like part and provided with a stud to extend through the slot, the stud having a flange overlying the convex part of said bottom.

2. A caster comprising a cup-like part provided with a concavo-convex resilient bottom having an elongated key-hole slot, combined with a caster member to fit against the concaved portion of said cup-like part and provided with a stud to extend through the slot, the stud having a flange overlying the convex portion of the bottom, and the concaved portion having an annular groove to receive a part of the caster.

3. A caster comprising a heeled bracket having a race, a cup member fitted over the bracket and provided with a race complemental to the other race, balls fitted in the respective races, the bracket having an opening and the cup member having a central opening, the wall of which is provided with a flange extending through the first mentioned opening and flanged in turn to fit against the inner under side of the body of the bracket, and a stud extending through and turning in the opening of the cup member.

In testimony whereof I affix my signature in presence of two witnesses.

JOSIAH ALBERT JONES

Witnesses:
W. P. MATHESON,
JOHN N. MATHESON.

Copies of this patent may be obtained for five cents each, by addressing the "Commissioner of Patents, Washington, D. C."